(12) United States Patent
Broden

(10) Patent No.: US 7,377,176 B1
(45) Date of Patent: May 27, 2008

(54) NANO-PARTICLE MODIFIED FILL FLUID FOR PRESSURE TRANSMITTERS

(75) Inventor: David A. Broden, Andover, MN (US)

(73) Assignee: Rosemount Inc., Eden Prairie, MN (US)

( * ) Notice: Subject to any disclaimer, the term of this patent is extended or adjusted under 35 U.S.C. 154(b) by 0 days.

(21) Appl. No.: 11/724,747

(22) Filed: Mar. 16, 2007

(51) Int. Cl.
*G01L 9/00* (2006.01)
(52) U.S. Cl. .......................................... 73/753
(58) Field of Classification Search ............... 73/753
See application file for complete search history.

(56) References Cited

U.S. PATENT DOCUMENTS

| | | | |
|---|---|---|---|
| 6,675,655 B2 * | 1/2004 | Broden et al. | 73/716 |
| 6,782,754 B1 * | 8/2004 | Broden et al. | 73/753 |
| 6,843,133 B2 * | 1/2005 | Broden et al. | 73/718 |
| 7,080,558 B2 * | 7/2006 | Broden et al. | 73/706 |
| 7,124,641 B2 * | 10/2006 | Broden et al. | 73/718 |

* cited by examiner

*Primary Examiner*—Andre J Allen
(74) *Attorney, Agent, or Firm*—Kinney & Lange, P.A.

(57) ABSTRACT

A pressure transmitter for measuring a pressure of a process fluid includes a pressure sensor, a hydraulic relay system and a pressure sensor fill fluid. The pressure sensor senses the pressure of the process fluid, and the hydraulic relay system provides a communication channel between the process fluid and the pressure sensor. The pressure sensor fill fluid in the hydraulic relay system comprises a first hydraulic fluid and a first volume of nano-particles. The first hydraulic fluid transmits a change in the pressure of the process fluid to the sensor. The first volume of nano-particles is suspended within the first hydraulic fluid and alters properties of the pressure sensor fill fluid.

27 Claims, 2 Drawing Sheets

NANO-PARTICLE MODIFIED FILL FLUID FOR PRESSURE TRANSMITTERS

BACKGROUND OF THE INVENTION

This invention relates generally to process instruments used in industrial process control systems. More particularly, the present invention relates to hydraulic fill fluids used in pressure transmitters.

Process transmitters are used to remotely monitor process variables of process fluids. For example, pressure transmitters are commonly used in the chemical processing industry for sensing pressures of petrochemicals or water. A pressure transmitter includes a sensor or transducer that produces an electrical output in response to physical changes in a process pressure. For example, a capacitive pressure transducer produces an electrical signal based on a change in capacitance due to a change in the pressure of a process fluid. The electrical signal of the sensor is processed by the transmitter circuitry to produce an electrical output that can be monitored as an indication of the pressure of the process fluid. Pressure transmitters also include electronics and circuitry for either remotely monitoring the electrical output through a control loop or network at a central monitoring location such as a control room, or locally such as with an LCD screen.

A typical capacitive pressure transducer includes a simple hydraulic system for communicating the process fluid pressure to the capacitive transducer. The hydraulic system is comprised of a hydraulic passageway that is filled with a precise level of fill fluid. At a first end of the hydraulic passageway is a transmitter isolation diaphragm that separates the fill fluid from the process fluid. At a second end of the hydraulic passageway is a sensor diaphragm that serves as a variable capacitor plate for the pressure sensor. The fill fluid typically comprises a hydraulic fluid that conveys the process fluid pressure from the transmitter isolation diaphragm to the sensor diaphragm. As the process fluid pressure fluctuates, the process fluid exerts a corresponding force on the isolation diaphragm at the first end of the hydraulic system, which through the fill fluid adjusts the position of the sensor diaphragm.

Additionally, remote seal systems are often used to distance the pressure transmitter from hazardous measurement environments, or for linking the pressure transmitter with inconveniently located process fluids. For example, remote seals are often used with corrosive or high temperature process fluids. In those situations, a remote seal having a capillary tube filled with hydraulic fill fluid can be used to relate the pressure transmitter to the process fluid while the pressure transmitter is located a safe distance away. The capillary tube may extend tens of meters in order to couple the pressure transmitter with the process fluid. The remote seal includes an isolation diaphragm at a first end of the capillary tube that separates the fill fluid from the process fluid. The second end of the capillary communicates with the isolation diaphragm of the transmitter. The incompressible fill fluid thus translates a pressure change of the process fluid from the remote seal isolation diaphragm to the transmitter isolation diaphragm. Thus, the electrical output of the pressure sensor is directly related to qualities of the hydraulic fill fluid, such as volume and capacitance, in the hydraulic system and the remote seal.

Process transmitter passageways and remote seal capillary tubes are filled at the factory with a precise amount of hydraulic fill fluid and then sealed. System performance is correlated with the precise level of fill fluid and is degraded with temperature fluctuations. For example, pressure transmitters are frequently used in high temperature settings. Fill fluids operating in such environments undergo thermal expansion that asserts forces against the various isolating diaphragms, which causes the pressure sensor to read a "back pressure," thus interfering with obtaining accurate pressure readings from the process fluid. Additionally, the capacitance of capacitive pressure sensors is affected by the presence of the hydraulic fill fluid between the capacitor plates of the sensor. Therefore, there is a need for hydraulic fill fluids having improved operating characteristics and qualities.

BRIEF SUMMARY OF THE INVENTION

The present invention is directed toward a pressure transmitter for measuring a pressure of a process fluid. The pressure transmitter includes a pressure sensor, a hydraulic relay system and a pressure sensor fill fluid. The pressure sensor senses the pressure of the process fluid, and the hydraulic relay system provides a communication channel between the process fluid and the pressure sensor. The pressure sensor fill fluid in the hydraulic relay system comprises a first hydraulic fluid and a first volume of nano-particles. The first hydraulic fluid transmits a change in the pressure of the process fluid to the sensor. The first volume of nano-particles is suspended within the first hydraulic fluid and alters properties of the pressure sensor fill fluid.

DETAILED DESCRIPTION

Figure 1:
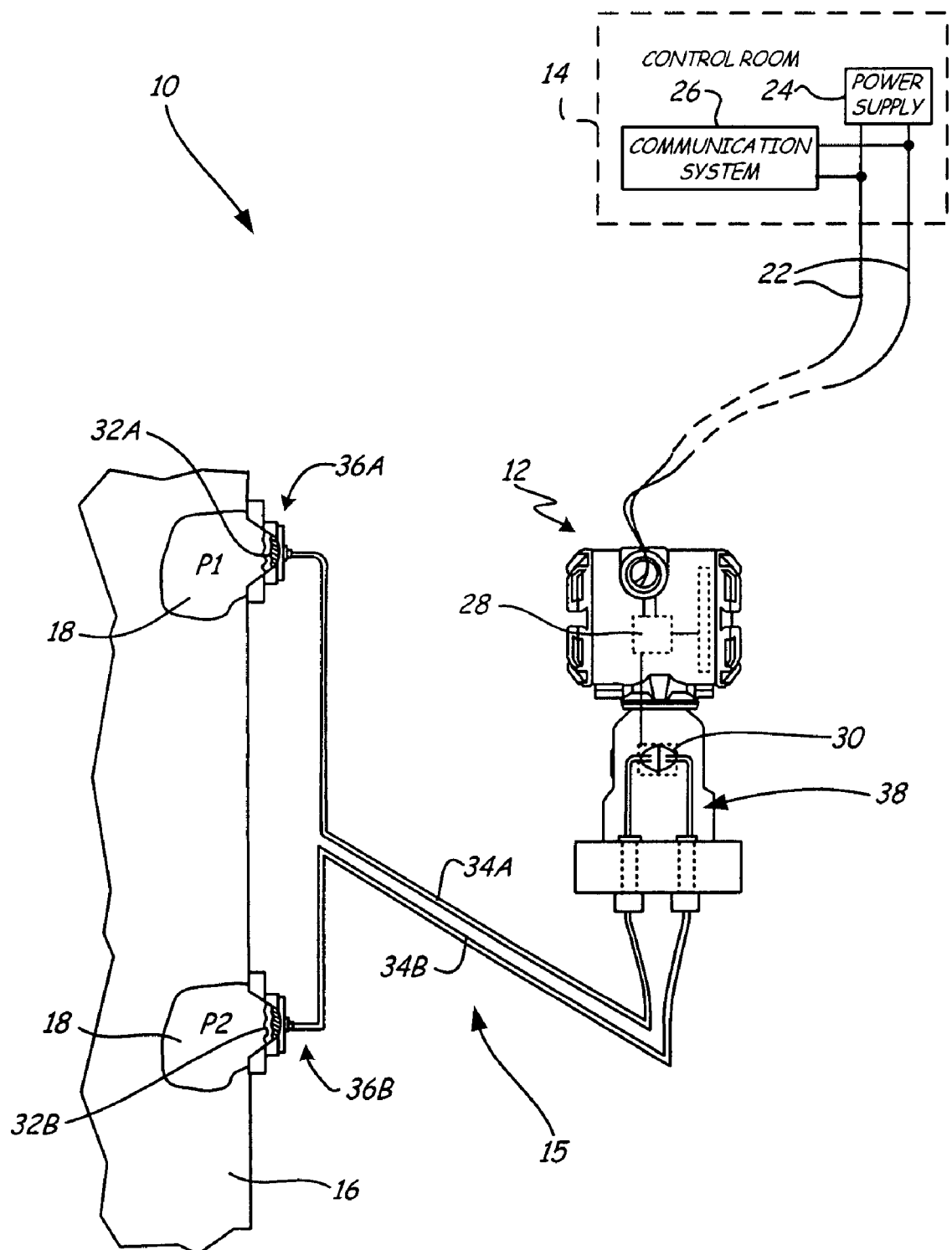
FIG. 1 shows a process control system, including a pressure transmitter having a remote seal, in which the fill fluid of the present invention is used.

FIG. 1 shows process control system 10, which includes pressure transmitter 12, control room 14, remote seal system 15 and process vessel 16. Pressure transmitter 12 senses the pressure level of process fluid 18 contained in process vessel 16 through remote seal system 15 and then relays the pressure signal to control room 14 over control loop 22. Control room 14 also supplies power to transmitter 12 from power supply 24 over control loop 22. Control loop 22 also enables communication system 26 to transmit data from control room 14 to transmitter 12, and to receive data from transmitter 12.

Pressure transmitter 12 includes transmitter circuitry 28 and sensor 30. Sensor 30 is hydraulically connected with process fluid 18 through remote seal system 15, which includes remote seal isolation diaphragms 32A and 32B, capillaries 34A and 34B and remote seals 36A and 36B. Pressure transmitter 12 also includes components for transmitting electrical signals generated by the pressure sensor over control loop 22 to control room 14 or a local display such as an LCD screen, or both. In one embodiment, control loop 22 and communication system 26 operate over a digital network protocol such as Fieldbus. Based on the data received from sensor 30 and transmitter 12, control room 14 is able to adjust process parameters either through control loop 22 or another control loop. For example, control room 14 can adjust the flow of process fluid 18 to vessel 16 by adjusting appropriate valves.

In order to transmit the pressure of process fluid 18 to pressure sensor 30 transmitter 12 is configured with hydraulic relay system 38 and connected with remote seal system 15. Relay system 38 includes passageways that are coupled with isolation diaphragms in transmitter 12 at their first ends and sensor 30 at their second ends. Hydraulic relay system 38 is supplied with a first fill fluid that is comprised of a first hydraulic fluid in which is suspended a first volume of property-altering nano-particles. Capillaries 34A and 34B extend from the transmitter isolation diaphragms to diaphragms 32A and 32B of remote seals 36A and 36B where they contact process fluid 18 of vessel 16. Capillaries 34A and 34B are filled with a second fill fluid comprising a second hydraulic fluid and a second volume of property-enhancing nano-particles. The second hydraulic fluid transmits the pressure of process fluid 18 from vessel 16 to transmitter 12, while the first hydraulic fluid transmits the pressure of process fluid 18 to sensor 30 through relay system 38. The composition of the first and second volumes of nano-particles can be selected to enhance the performance of the fill fluids without unduly impacting the performance of sensor 30 or transmitter 12. For example, the nano-particles can be selected to reduce the impact of environmental variations, such as temperature change, on the performance of transmitter 12. In other embodiments, the nano-particles can be selected to adjust the dielectric constant of capacitive pressure sensors.

Figure 2:
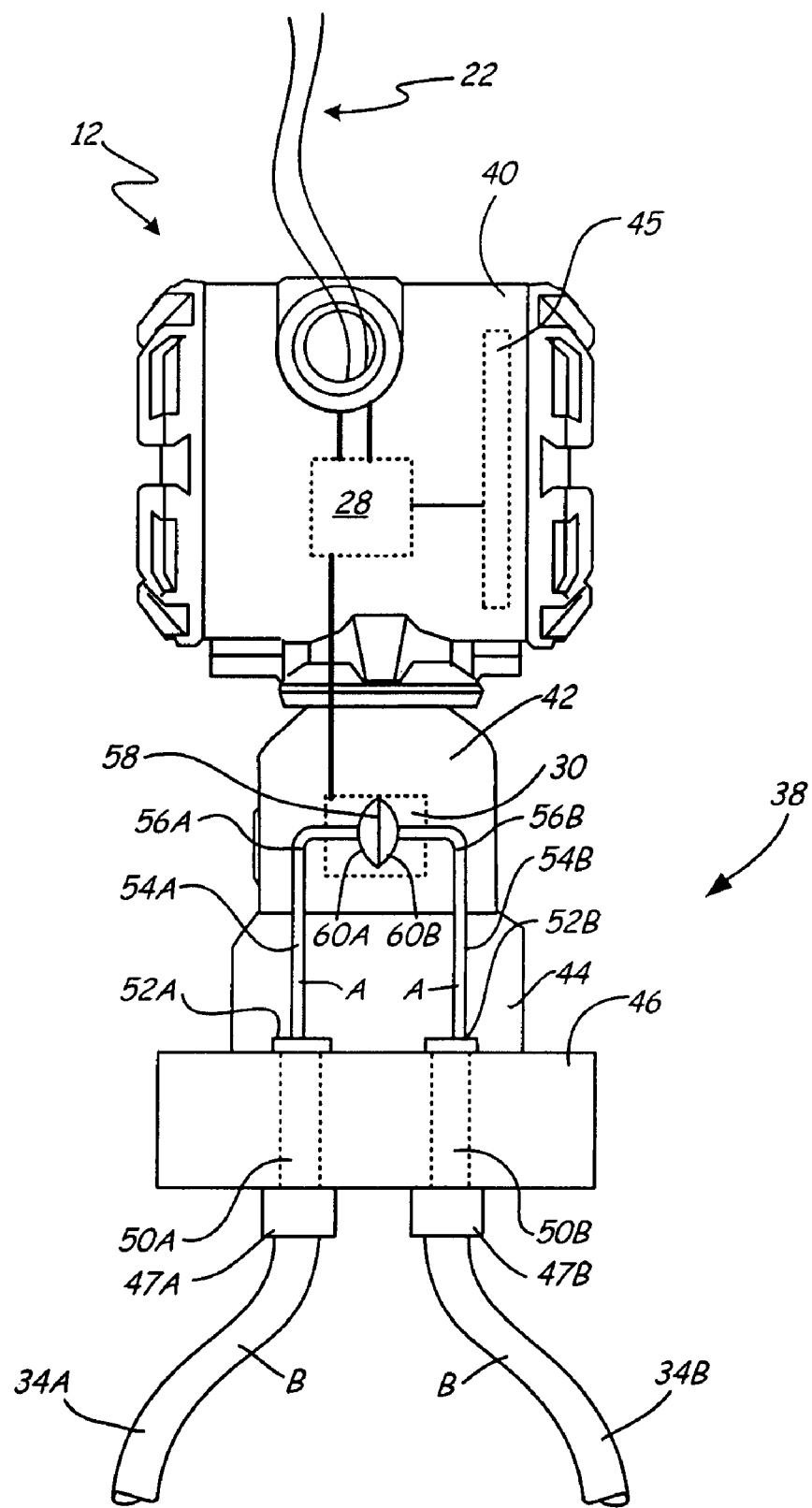
FIG. 2 is a schematic side view of the pressure transmitter of FIG. 1 including a capacitive pressure sensor configured for differential pressure measurement.

FIG. 2 shows an embodiment of process transmitter 12 having first and second fill fluids each comprising a hydraulic fluid and a volume of nano-particles. Process transmitter 12 includes transmitter circuitry 28, sensor 30, housing 40, module 42, base 44 and LCD 45. Sensor 30 senses a physical change in the pressure of process fluid 18 (FIG. 1) through fill fluid A of hydraulic relay system 38 and fill fluid B of remote seal system 15 (FIG. 1). It is appreciated that fill fluid including nano-particles may be used in a transmitter without having a remote seal system. Sensor 30 is in electronic communication with transmitter circuitry 28. Circuitry 28 conditions the output of sensor 30 into a usable format whereby it is relayed for local monitoring at LCD 45 connected to electronics 28, or to control room 14 (FIG. 1.) through control loop 22 (FIG. 1). In other embodiments, transmitter circuitry 28 communicates over a wireless network. In still other embodiments, the conditioned output of sensor 30 is readable by a handheld device linked by wires or wirelessly with pressure transmitter 12.

Transmitter 12 is connected to capillaries 34A and 34B through relay system 38 and process flange 46. Process flange 46 is typically bolted or otherwise secured to base 44 of transmitter 12. In one embodiment flange 16 comprises a COPLANAR™ process flange. Flange 16 includes channels 50A and 50B, which are connected with capillaries 34A and 34B, respectively, of remote seal system 15. Capillaries 34A and 34B are connected with flange 46 through couplers 47A and 47B, which can comprise any coupling system such as threaded couplers. Through fill fluid B, channels 50A and 50B are in fluid communication with diaphragms 52A and 52B of base 44. Through fill fluid A, diaphragms 52A and 52B are in fluid communication with sensor 30 using relay system 38, which comprises lower passageways 54A and 54B, and upper passageways 56A and 56B.

Module 42 and base 44 are typically cast and machined as a unitary piece, with module 42 primarily comprising a hollowed out cavity for holding sensor 30. Module 42 and base 44 together provide a framework that permits diaphragms 52A and 52B to communicate with sensor 30, and provide relay system 38 for connecting transmitter 12 with capillaries 34A and 34B of remote seal system 15. Lower passageways 54A and 54B typically comprise narrow channels machined into mounting base 44. Upper passageways 56A and 56B typically comprise segments of stainless steel tubing welded to base 44 at the opening of lower passageways 54A and 54B. In series, the upper and lower passageways extend from the bottom surface of base 44 through to sensor diaphragm 58, and provide a sealed channel that extends the reach of sensor 30 to diaphragms 52A and 52B. Passageways 54A and 54B are sealed at lower ends by diaphragms 52A and 52B, respectively, and are joined at upper ends with lower ends of passageways 56A and 56B. Upper ends of passageways 54A and 54B are then joined with capacitor plates 60A and 60B of sensor 30.

Relay system 38 allows pressure sensor 30 to be brought into contact with process fluid 18. Remote seal system 15 allows relay system 38 to extend beyond the confines of transmitter 12. In order to do so, it is necessary to introduce first fill fluid A and second fill fluid B into process control system 10, which each introduce another source of potential error in the system. Passageways 54A and 54B, and 56A and 56B are filled with first fill fluid A. Thus, diaphragms 52A and 52B are hydraulically connected with diaphragm 58 of sensor 30. Diaphragms 52A and 52B are hydraulically connected with remote seals 36A and 36B (FIG. 1), which are connected with process fluid 18, through capillaries 34A and 34B. Capillaries 34A and 34B are filled with second fill fluid B. Thus, process fluid 18 is fluidly connected with sensor 30 through second fill fluid B present in capillaries 34A and 34B, and first fill fluid A present in passageways 54A, 54B, 56A and 56B.

First fill fluid A and second fill fluid B are each comprised of a pressure transmitting hydraulic fluid and a volume of nano-particles. First fill fluid A is comprised of a first hydraulic fluid and a first volume of nano-particles. Second fill fluid B is comprised of a second hydraulic fluid and a second volume of nano-particles. The first hydraulic fluid and the second hydraulic fluid can be any suitable hydraulic fluid that is known in the art. Such hydraulic fill fluids are typically inert, stable and substantially incompressible. Additionally, the hydraulic fluids have dielectric properties that make them suitable for serving within capacitance-based pressure sensors. In various embodiments, the first and second hydraulic fluids are comprised of DC 200®, DC 704® or Syltherm XLT® silicone oil as is commercially available from Dow Corning Corporation, Midland, Mich., USA. In other embodiments, similar fluids can be used such as Halocarbon® from Halocarbon Products Corporation, River Edge, N.J., USA; Neobee® M-200 from Stepan Company, Northfield, Ill., USA; glycerin and water, peanut oil or propylene glycol. In other embodiments of the present invention, first fill fluid A and second fill fluid B may be supplemented with additional additives. For example, leak detection and prevention additives may be included in the fill fluid composition when needed.

A particular error arises from the temperature responsiveness of fill fluid A and fill fluid. B. Typically, pressure transmitters are electronically calibrated at the factory such that the pressure sensor is set to measure zero pressure at, for example, room temperature, around 25° C. Alternatively, the calibration of transmitter 12 can be manually reset after the transmitter has been installed. This is, however, time consuming and does not account for temperature variations that arise during the day-to-day operations of process control system 10. For example, fill fluid A and fill fluid B can be affected by an extremely hot day. Also, remote seal system 15 does not include any calibration adjusting mechanism.

Changing the operating temperature of transmitter 12 may produce non-negligible error in the output of sensor 30. Hydraulic fluids that have high thermal expansion rates expand in volume when heated. Specifically, the first and second hydraulic fluids undergo various degrees of thermal expansion depending on the operating environment of transmitter 12 and remote seal system 15. Vessel 16 may be operating in an extremely hot environment, for which remote seals 36A and 36B are used to distance transmitter 12. As such, second fill fluid B exhibits a particular temperature gradient, with an associated thermal expansion, as it extends from remote seals 36A and 36B to transmitter 12. In a similar situation, transmitter 12 and remote seal system 15 may be used in one implementation with vessel 16, and then may be subsequently moved to another vessel having a different operating temperature. As such, for each implementation first fill fluid A and second fill fluid B exhibit different degrees of thermal expansion.

Accordingly, when remote seal system 15 or transmitter 12 is placed in an environment having a temperature higher then that at which it is calibrated, the hydraulic fluid expands and deflects isolating diaphragms 52A and 52B as well as isolating diaphragms 32A and 32B of remote seals 36A and 36B. As such, pressure sensor 30 registers a "back pressure" that can produce an error up to 10% of the pressure reading. This is an undesirable error, as the goal of the pressure transmitter is to measure changes in the process fluid's pressure, not alterations in the operating environment temperature. Thus, first fill fluid A and second fill fluid B are provided with respective volumes of nano-particles for reducing the impact of thermal expansion rates of the respective hydraulic fluids. In one embodiment, the error due to thermal expansion of the fill fluid is reduced to about 1% of the pressure reading using a nano-particle additive having a lower coefficient of thermal expansion than the hydraulic fluid.

Process fluid 18 has an associated pressure P1 that exerts a force on isolation diaphragm 32A nearer the top of vessel 16. Process fluid 18 also has an associated pressure P2 nearer the bottom of vessel 16 that exerts a force on isolation diaphragm 32B. P1 is transmitted from isolation diaphragm 32A by second fill fluid B of capillary 34A to isolation diaphragm 52A of transmitter 12, such that the pressure in capillary 34A equals pressure P1. Likewise, P2 is transmitted from isolation diaphragm 32B by second fill fluid B of capillary 34B to isolation diaphragm 52B of transmitter 12, such that the pressure in capillary 34A equals pressure P2. The forces associated with P1 and P2 are transmitted from isolation diaphragms 52A and 52B to sensor diaphragm 58 by first fill fluid A, such that the pressures in passageways 54A and 56A equals pressure P1 and P2, respectively. As such a pressure differential P1-P2 is created across pressure diaphragm 58.

As the ambient temperature surrounding process control system 10 rises, the first hydraulic fluid of first fill fluid A and the second hydraulic fluid of second fill fluid B expand in volume at a rate corresponding to their respective coefficients of thermal expansion. As such fill fluid A in passageways 54A and 56A deflects sensor diaphragm 58 and isolation diaphragm 52A, and fill fluid B in capillary 34A deflects isolation diaphragm 52A and isolation diaphragm 32A. Likewise, fill fluid A in passageways 54B and 56B deflects sensor diaphragm 58 and isolation diaphragm 52B, and fill fluid B in capillary 34B, deflects isolation diaphragm 52B and isolation diaphragm 32B. Diaphragms 52A and 52B, 32A and 32B and sensor diaphragm 58 are spring like elements than can flex either inward or outward with respect to passageways 54A-56B and capillaries 34A and 34B. As such, pressure sensor 30 may sense pressure P1-P2+/−X (where X represents the net volumetric expansion pressure influence on sensor diaphragm 58), depending on how the volumetric expansion of fill fluids A and B add up within remote seal system 15 and relay system 38.

The amount of volumetric expansion of fill fluids A and B depends on several variables, including the geometry of passageways 54A-56B and capillaries 34A and 34B, the volume of fill fluids A and B, and the coefficient of thermal expansion of fill fluids A and B. Because passageways 54A-56B and capillaries 34A and 34B are generally long, narrow and rigid, fill fluids A and B must expand in the direction of diaphragms 32A and 32B, 52A and 52B, and 58. Thus, even a small expansion of fill fluids A or B results in a deflection of the diaphragms detectable by sensor 30. It is infeasible to change to a fill fluid with a lower coefficient of thermal expansion because the fill fluids have particular mechanical and electrical properties that make them well suited for functioning in pressure transmitters and capacitive pressure sensors. Thus, the expansion can be compensated for by adding nano-particles having a lower coefficient of thermal expansion than fill fluids A and B, to reduce the overall volume of fill fluids A and B, but without altering their desirable mechanical and electrical properties.

Nano-particles are readily added to fill fluids A and B because they do not interfere with the functioning of the first and second hydraulic fluids. Nano-particles are suspended into the hydraulic fluids and are sufficiently small that they will remain in such a state. Nano-particles will not settle out of the hydraulic fluids and accumulate along the passageways and capillaries into which they are dispersed. Also, nano-particles are inert such that they will not react with the hydraulic fluids and will not alter the properties of the hydraulic fluids. The nano-particles will, however, contribute to the overall properties of the fill fluid in quantities proportional to the volumetric distribution of the hydraulic fluid and nano-particle volume. That is to say, a fill fluid having fifty percent by volume hydraulic fluid and fifty percent by volume nano-particles will have electrical and mechanical properties (e.g. dielectric constant and coefficient of thermal expansion) that are an average of the electrical and mechanical properties of the hydraulic fluid and nano-particles. However, in order to preserve the pressure transmitting capability of the fill fluid, it is desirable that the nano-particles comprise less than about twenty five percent of the fill fluid.

By adding a sufficient volume of nano-particles, the volume of fill fluid A or B can be sufficiently reduced to reduce the effect of the volumetric expansion from the thermal effects. Since the volume of fill fluid A or B is reduced, there will be less fill fluid to expand. In order to replenish the lost volume of fill fluid A or B, such that pressure P1 or P2 can be properly conveyed to sensor 30, the volume within passageways 54A-56B and capillaries 34A and 34B is replenished with the nano-particles. Since the nano-particles have a low coefficient of expansion, the overall thermal expansion of the solutions comprising fill fluids A and B within passageways 54A-56B and capillaries 34A and 34B are reduced. Nano-particles are small enough to remain in suspension within the hydraulic fill fluid such that the pressure transmitting capabilities of the hydraulic fill fluid remains in tact. Thus, nano-particle enhanced fill fluids significantly reduce thermally induced errors in the pressure measurement signals, such as from thermal expansion.

The nano-particle enhanced fill fluid can also reduce the effects of thermal cycle hysteresis. Temperature hysteresis error is a variation in the pressure sensor reading at the same pressure when the ambient temperature is being approached from a higher temperature rather than a lower temperature. Variations in temperature exaggerate the hysteresis error due to the changes in the volume of the fill fluid. For example, at room temperature (about 25° C.) transmitter 12 may exhibit an error of about 0.005 psi after the temperature has cooled from, say, 80° C. However, transmitter 12 may exhibit an error of about 0.003 psi at room temperature after the temperature has heated from, say, −40° C. Some of this error is caused by the hydraulic fluid expanding and contracting with the temperature. Thus, a reduction in fill fluid expansion also reduces thermal cycle hysteresis, with an associated error reduction.

The volumes of nano-particles added to fill fluids A and B can be comprised of any nano-particles that have a lower coefficient of thermal expansion than fill fluids A or B in a temperature range that process control system 10 is likely to be used in. In one embodiment the nano-particles comprise carbon particles having ball-like or rod-like shape. In various embodiments the nano-particles have the following compositions with associated coefficients of thermal expansion: $Zr_2P_2O_9$ (0.4° $C.^{-1} \times 10^6$), $Li_2O$—$Al_2O_3$-$4SiO_2$ [β-Spodumene] (0.9° $C.^{-1} \times 10^6$), or other similar nano-particles. For comparison, DC 200 has a coefficient of thermal expansion of about 1080° $C.^{-1} \times 10^6$. In one embodiment, first fill fluid A and second fill fluid B are comprised of a mix of hydraulic fluid to nano-particle composition in a ratio of about 3:1 to about 4:1 by volume. In other embodiments of the invention it is possible to use nano-particles that have negative coefficients of thermal expansion so that the thermal expansion of the hydraulic fluid can be completely cancelled out. For example, the above-referenced $Li_2O$—$Al_2O_3$-$2SiO_2$ [β-Eucryptite] has a coefficient of thermal expansion of −6.2° $C.^{-1} \times 10^6$. Thus, by varying the nano-particle composition and volume, the thermal expansion rate of fill fluids A and B can be reduced to reduce associated error in pressure sensor 30.

In the case of fill fluid A, it is also desirable that the nano-particles do not interfere with the capacitance-based operation of sensor 30. However, it is also possible to enhance the operation of sensor 30 by selecting nano-particles that have higher dielectric constants.

Typically, sensor 30 is a transducer that produces an electrical signal in response to a change in the pressure of process fluid 18 as presented through first fill fluid A of passageways 54A-54B. Sensor 30 is a differential, capacitance-based pressure cell comprising sensor diaphragm 58, first capacitor plate 60A and second capacitor plate 60B. Sensor diaphragm 58 is typically comprised of a stainless steel, and capacitor plates 60A and 60B typically comprise of thin metal layer deposited on a ceramic or glass substrate. Typically, diaphragm 58 and capacitor plates 60A and 60B are comprised of corrosion resistant materials. The capacitance between diaphragm 58 and first capacitor plate 60A and the capacitance between diaphragm 58 and second capacitor plate 60B changes as the location of diaphragm 58 changes due to pressure changes in process fluid 18, as presented through fill fluids A and B. Capacitance between diaphragm 58 and one of capacitor plates 60A or 60B will increase while the other will decrease. This results in pressure sensor 30 producing a double signal that helps in reducing error. The change in the amount of energy stored on the capacitor due to the pressure change is measured by transmitter circuitry 28 as an indication of the change in magnitude of the differential pressure between pressure P1 and P2.

The amount of energy stored on a capacitor is directly related to the capacitance of the capacitor. The capacitance is proportional to the area of the electrode plates and the dielectric constant of the material between the electrode plates, and inversely proportional to the distance between the electrode plates. In sensor 30, a first capacitor is formed by sensor diaphragm 58 and first capacitor plate 60A. In order to produce a sensor signal large enough to be detected by transmitter circuitry 28, the charge stored by the capacitor must be large enough. However, it is also desirable to reduce the size of the capacitor as much as possible to reduce the overall size of sensor 30 and transmitter 12. Thus, it is impractical to enlarge the capacitor plates to increase the charge. There is also a practical limitation as to how close the capacitor plates can be brought together. Thus in order to increase the charge of the capacitor, it is necessary to increase the dielectric between the capacitor plates. However, this too is not easily accomplished, as there must be free movement of sensor diaphragm 58 so that it can deflect under different pressure conditions. The first hydraulic fluid is typically used as the fluid for deflecting diaphragm 58 and is selected to provide a predictable dielectric constant and to provide vibration damping to diaphragm 58 to eliminate noise from sensor 30. Thus, the first hydraulic fluid provides the dielectric material between the capacitor plates.

In one embodiment of the invention, a second volume of nano-particles is suspended in the first hydraulic fluid to increase the dielectric constant of the material between pressure diaphragm 58 and capacitor plates 60A and 60B. In other embodiments, a single composition of nano-particles can be selected to have both thermal expansion reducing properties and dielectric constant increasing properties. Accordingly, the amount of charge available for storage in sensor 30 increases as the dielectric constant increases. Thus, from a design standpoint, the size of the capacitor plates forming sensor 30 can be reduced in order to maintain the rest capacitance signal of pressure sensor 30. Accordingly, nano-particles having high dielectric constants are used to reduce the size of sensor 30. In other embodiment, nano-particles having high dielectric constants can be used to increase the sensitivity of sensor 30. If the capacitors comprising the sensor are able to store more energy, sensor 30 is able to produce a more noticeable signal for smaller pressure changes. Thus, nano-particles having a high dielectric constant can be added to fill fluid A to increase the sensitivity of sensor 30.

The nano-particles can be comprised of any nano-particle material that has a higher dielectric constant than that of the first hydraulic fluid. In one embodiment the nano-particles comprise carbon particles having ball-like or rod-like shape. In one embodiment, the second volume of nano-particles are comprised of alumina (ceramic) particles having a dielectric constant of about 4.5. In another embodiment, the second volume of nano-particles are comprised of aluminum oxide particles having a dielectric constant of about 7.0. In yet another embodiment, the second volume of nano-particles are comprised of carbon based particles, such as diamond, having a dielectric constant of about 3.5 to about 5.0. The dielectric constant of DC 200 is about 2.3. In one embodiment, first fill fluid A is comprised of a mix of hydraulic fluid to nano-particle composition in a ratio of about 3:1 to about 4:1 by volume. Thus, by varying the nano-particle composition and volume of the first hydraulic fluid, the capacitance of sensor 30 rate can be increased to reduce the size of sensor 30 or increase the sensitivity of sensor 30.

In various embodiments of the invention, various volumes of nano-particles can be suspended in the fill fluids. For example, a single volume of nano-particles can be suspended to enhance either the dielectric of the capacitor-based pressure sensor, or to reduce the thermal expansion of the fill fluid. Also, a single volume of nano-particles could be suspended to both increase the dielectric of the capacitor-based pressure sensor and to reduce the thermal expansion of the fill fluid. In another embodiment, multiple-volumes of nano-particles can be suspended in the fill fluid to provide multiple functions.

Although the present invention has been described with reference to preferred embodiments, workers skilled in the art will recognize that changes may be made in form and detail without departing from the spirit and scope of the invention.

The invention claimed is:

1. A pressure transmitter for measuring a pressure of a process fluid, the pressure transmitter comprising:
   a pressure sensor for sensing the pressure of the process fluid;
   a hydraulic relay system for providing a communication channel between the process fluid and the pressure sensor; and
   a pressure sensor fill fluid in the hydraulic relay system, the pressure sensor fill fluid comprising:
     a first hydraulic fluid for transmitting a change in the pressure of the process fluid to the sensor; and
     a first volume of nano-particles suspended within the first hydraulic fluid for altering properties of the pressure sensor fill fluid.

2. The pressure transmitter of claim 1 wherein the first volume of nano-particles comprises nano-particles having a coefficient of thermal expansion lower than that of the first hydraulic fluid.

3. The pressure transmitter of claim 2 wherein the nano-particles are selected from the group consisting of $Zr_2P_2O_9$, $Li_2O$—$Al_2O_3$-$4SiO_2$ (β-Spodumene) or $Li_2O$—$Al_2O_3$-$2SiO_2$ (β-Eucryptite).

4. The pressure transmitter of claim 2 wherein the first volume of nano-particles plus a volume of the first hydraulic fluid fills up the hydraulic relay system such that the pressure of the process fluid is conveyed to the pressure sensor.

5. The pressure transmitter of claim 4 wherein thermal related volumetric expansion of the hydraulic fluid is reduced by the first volume of nano-particles.

6. The pressure transmitter of claim 1 wherein the first hydraulic fluid and first volume of nano-particles are distributed by volume in a ratio up to about 4:1.

7. The pressure transmitter of claim 1 wherein the first volume of nano-particles comprises nano-particles having a dielectric constant greater than that of the first hydraulic fluid.

8. The pressure transmitter of claim 7 wherein the nano-particles particles are selected from the group consisting of carbon-based, alumina (ceramic) and aluminum oxide particles.

9. The pressure transmitter of claim 7 wherein the nano-particles increase a capacitance of the pressure sensor to increase sensitivity of the pressure sensor as compared to fill fluid without nano-particles.

10. The pressure transmitter of claim 1 and further comprising a remote seal system comprising:
    a capillary tube for extending reach of the hydraulic relay system;
    a remote seal fill fluid within the capillary tube, the remote seal fill fluid comprising:
      a second hydraulic fluid for communicating the pressure of the process fluid through the capillary tube; and
      a second volume of nano-particles suspended within the second hydraulic fluid for altering properties of the remote seal fill fluid.

11. The pressure transmitter of claim 10 wherein the second volume of nano-particles comprises nano-particles having a coefficient of thermal expansion lower than that of the second hydraulic fluid.

12. A pressure transmitter for measuring pressure of a process fluid, the pressure transmitter comprising:
    a pressure sensor for measuring the pressure of the process fluid;
    a transmitter housing having a hydraulic passageway comprising:
      a first end extending from the pressure sensor; and
      a second end having an isolation diaphragm for connection to a process fluid source; and
    a fill fluid having a thermal expansion coefficient and positioned in the passageway; the fill fluid comprising:
      a hydraulic fluid for transmitting the process fluid pressure from the isolation diaphragm to the sensor; and
      thermal expansion reducing nano-particles for reducing the thermal expansion coefficient of the fill fluid.

13. The pressure transmitter of claim 12 wherein the thermal expansion reducing nano-particles have a coefficient of thermal expansion lower than that of the hydraulic fluid.

14. The pressure transmitter of claim 12 wherein the thermal expansion reducing nano-particles are selected from the group consisting of $Zr_2P_2O_9$, $Li_2O$—$Al_2O_3$-$4SiO_2$ (β-Spodumene) or $Li_2O$—$Al_2O_3$-$2SiO_2$ (β-Eucryptite).

15. The pressure transmitter of claim 12 wherein the thermal expansion reducing nano-particles comprise up to about twenty-five percent by volume of the fill fluid.

16. The pressure transmitter of claim 12 wherein:
    the pressure sensor further comprises a sensor diaphragm positioned at a first end of the passageway and for acting as a capacitor plate in a capacitor of the pressure sensor; and
    the fill fluid further comprises dielectric increasing nano-particles for increasing capacitance of the capacitor.

17. The pressure transmitter of claim 16 wherein the dielectric increasing nano-particles comprise the thermal expansion reducing nano-particles.

18. A pressure transmitter for measuring pressure of a process fluid, the pressure transmitter comprising:
    a pressure sensor for measuring the pressure of the process fluid;
    a transmitter housing having a hydraulic passageway extending from the pressure sensor to a process fluid source;
    an isolation diaphragm at a first end of the passageway and for separating the process fluid source from the hydraulic passageway;
    a sensor diaphragm at a second end of the passageway and for acting a capacitor plate in a capacitor of the pressure sensor, wherein the capacitor has a capacitance; and
    a fill fluid in the passageway; the fill fluid comprising:
      a hydraulic fluid for transmitting the process pressure from the isolation diaphragm to the sensor; and
      nano-particles for increasing the capacitance of the capacitor.

19. The pressure transmitter of claim 18 wherein the nano-particles are selected from the group consisting of carbon-based, alumina (ceramic) and aluminum oxide particles.

20. The pressure transmitter of claim 18 wherein the nano-particles comprise up to about twenty-five percent by volume of the fill fluid.

21. The pressure transmitter of claim 18 wherein the nano-particles have a dielectric constant greater than that of the hydraulic fluid.

22. The pressure transmitter of claim 18 wherein the nano-particles increase the capacitance of the pressure sensor to increase sensitivity of the pressure sensor as compared to fill fluid without nano-particles.

23. A remote seal system for use with a pressure transmitter, the remote seal system comprising:
a capillary tube;
a first isolation diaphragm at a first end of the capillary tube for contacting a process fluid;
a coupler at a second end of the capillary tube for connecting the capillary tube with a second isolation diaphragm of the process transmitter; and
a fill fluid having a thermal expansion rate and positioned in the capillary tube, the fill fluid comprising:
a hydraulic fluid for relaying a change in the first isolation diaphragm to the second isolation diaphragm; and
nano-particles suspended in the hydraulic fluid for reducing the thermal expansion rate of the fill fluid.

24. The remote seal system of claim 23 wherein the nano-particles have a coefficient of thermal expansion lower than that of the hydraulic fluid.

25. The remote seal system of claim 23 wherein the nano-particles are selected from the group consisting of $Zr_2P_2O_9$, $Li_2O$—$Al_2O_3$-$4SiO_2$ (β-Spodumene) or $Li_2O$—$Al_2O_3$-$2SiO_2$ (β-Eucryptite).

26. The remote seal system of claim 23 wherein the nano-particles reduce thermal related volumetric expansion of the fill fluid as compared to a fill fluid lacking nano-particles.

27. The remote seal system of claim 23 wherein the nano-particles comprise up to about twenty-five percent by volume of the fill fluid.

* * * * *